(12) United States Patent
Hocquette

(10) Patent No.: US 9,862,485 B2
(45) Date of Patent: Jan. 9, 2018

(54) ANTIVIBRATION SUSPENSION SYSTEM FOR A TIE BAR OF AN AIRCRAFT POWER TRANSMISSION GEARBOX, AN ANTIVIBRATION SUSPENSION SYSTEM, AND AN AIRCRAFT

(71) Applicant: AIRBUS HELICOPTERS, Marignane (FR)

(72) Inventor: Julien Hocquette, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 176 days.

(21) Appl. No.: 15/066,367

(22) Filed: Mar. 10, 2016

(65) Prior Publication Data

US 2016/0264236 A1   Sep. 15, 2016

(30) Foreign Application Priority Data

Mar. 13, 2015   (FR) ..................... 15 00485

(51) Int. Cl.
   *B64B 1/24*   (2006.01)
   *B64C 27/00*   (2006.01)

(52) U.S. Cl.
   CPC ...... *B64C 27/001* (2013.01); *B64C 2027/004* (2013.01); *B64C 2027/005* (2013.01)

(58) Field of Classification Search
   CPC ............ B64C 27/001; B64C 2027/002; B64C 2027/004; B64C 2027/005
   See application file for complete search history.

(56) References Cited

U.S. PATENT DOCUMENTS

| 1,641,230 | A |   | 9/1927 | Manville |
|---|---|---|---|---|
| 4,365,770 | A |   | 12/1982 | Mard et al. |
| 6,016,289 | A | * | 1/2000 | Kaelin ..................... G04B 5/02 368/203 |
| 6,164,915 | A | * | 12/2000 | Certain ................. B64C 27/001 248/123.11 |
| 6,283,408 | B1 |   | 9/2001 | Ferullo et al. |
| 7,472,864 | B2 |   | 1/2009 | Bietenhader |

(Continued)

FOREIGN PATENT DOCUMENTS

| EP | 0853197 | 7/1998 |
|---|---|---|
| FR | 2787762 | 6/2000 |

(Continued)

OTHER PUBLICATIONS

English Translation of the Korean Notice of Preliminary Rejection for Korean Application No. 10-2016-0029702, Completed by the Korean Patent Office on Apr. 1, 2017, 2 Pages.

(Continued)

*Primary Examiner* — Richard G Davis
(74) *Attorney, Agent, or Firm* — Brooks Kushman P.C.

(57) ABSTRACT

An antivibration suspension system of an aircraft, the antivibration suspension system comprising a lever and an oscillating mass. The antivibration suspension system comprises a mechanical motion amplifier device interposed between the lever and the oscillating mass, the motion amplifier device being provided both with a mechanical inlet constrained to move in rotation with the lever about a control axis and with a mechanical outlet driving rotary movement of the oscillating mass.

15 Claims, 3 Drawing Sheets

(56) References Cited

U.S. PATENT DOCUMENTS 8,888,037 B2* 11/2014 Pula .................. B64D 27/26
 188/379
2015/0136900 A1* 5/2015 Griffin .................. B64D 35/00
 244/54

FOREIGN PATENT DOCUMENTS

| FR | 2878594 | 6/2006 |
|----|---------|--------|
| FR | 2982583 | 5/2013 |
| GB | 207028 | 11/1923 |

OTHER PUBLICATIONS

Canadian Examiners Report dated May 18, 2017, Application No. CA 2,923,020, 4 Pages.
French Search Report for French Application No. 1500485, Completed by the French Patent Office on Jan. 11, 2016, 6 Pages.

* cited by examiner

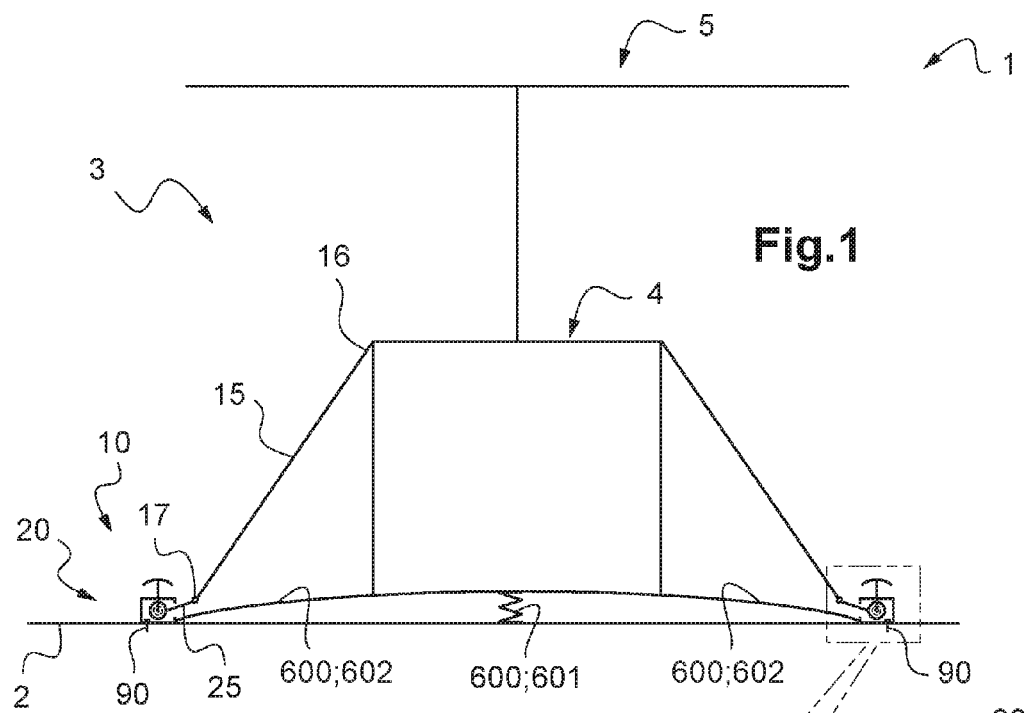
Fig.1
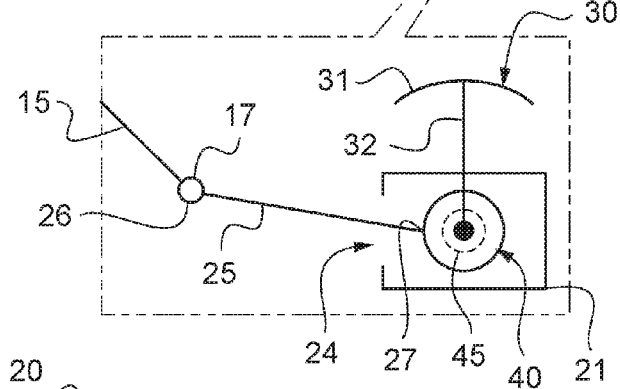
Fig.2
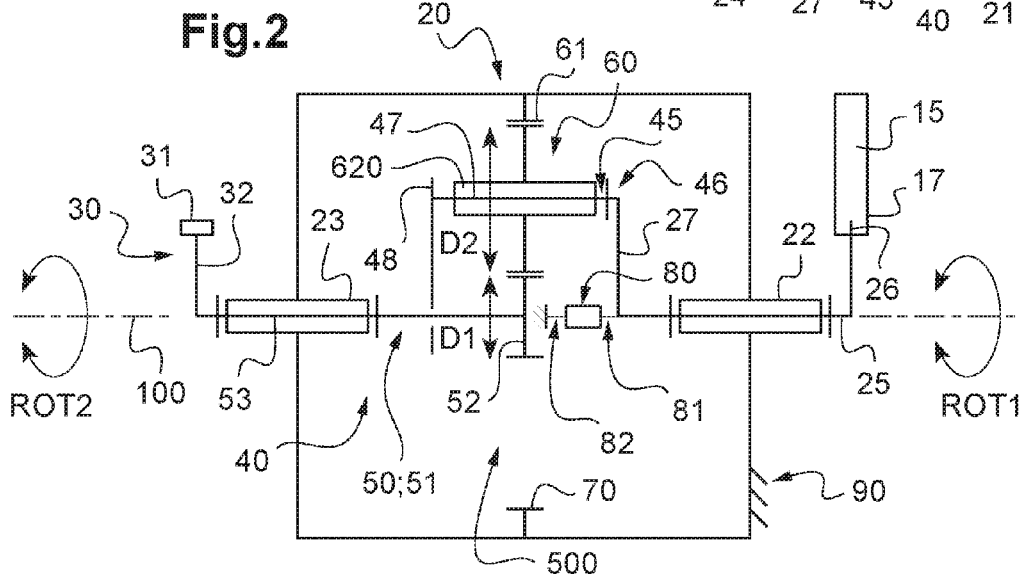

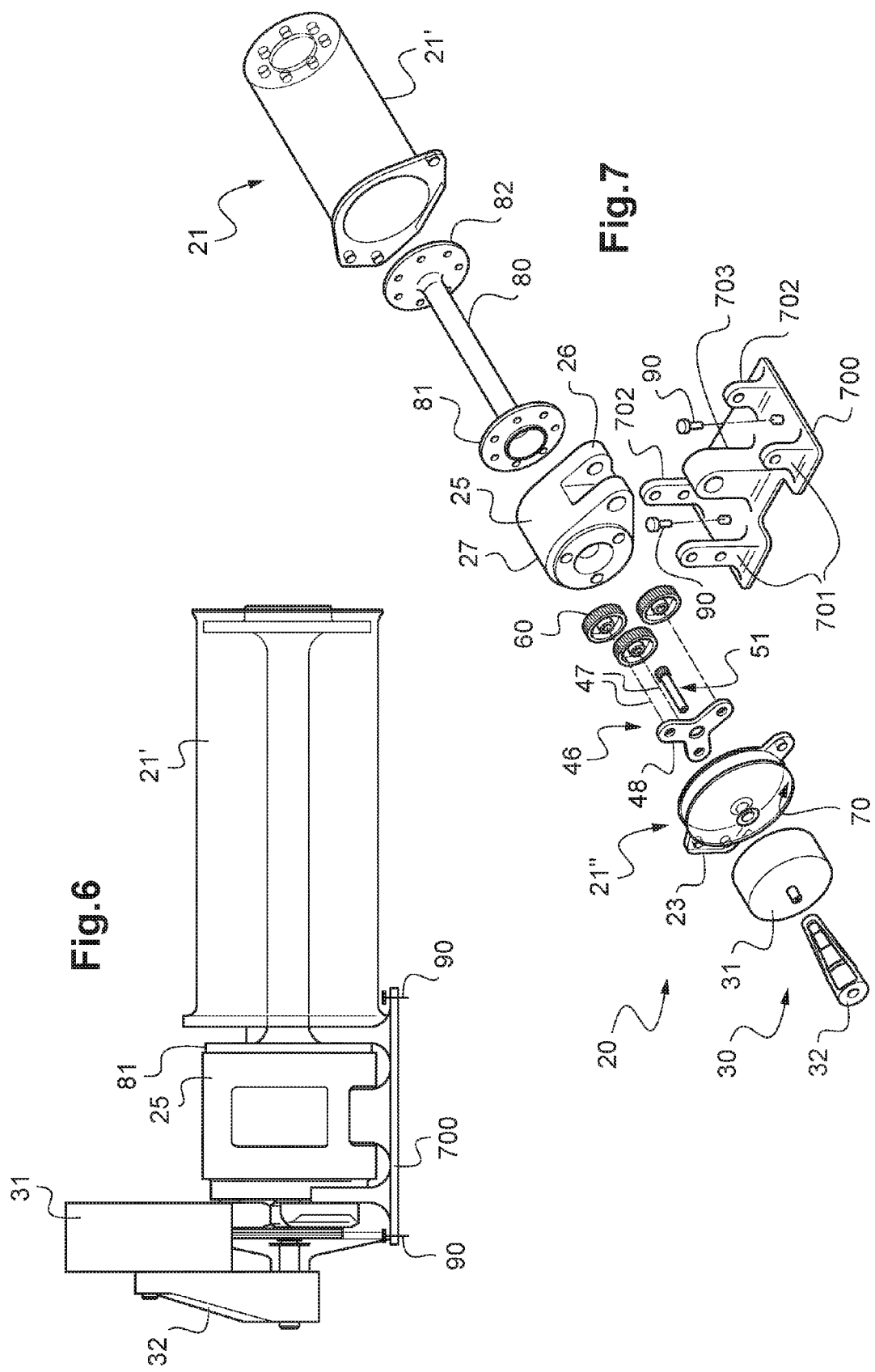

ANTIVIBRATION SUSPENSION SYSTEM FOR A TIE BAR OF AN AIRCRAFT POWER TRANSMISSION GEARBOX, AN ANTIVIBRATION SUSPENSION SYSTEM, AND AN AIRCRAFT

CROSS REFERENCE TO RELATED APPLICATIONS

This application claims priority to French patent application No. FR 15 00485 filed on Mar. 13, 2015, the disclosure of which is incorporated in its entirety by reference herein.

BACKGROUND OF THE INVENTION (1) Field of the Invention

The present invention relates to an antivibration suspension system for a tie bar of a power transmission gearbox, to an antivibration suspension structure having the antivibration suspension system, and to an aircraft having such a structure.

The invention thus lies in the narrow technical field of devices for reducing vibration on board aircraft.

(2) Description of Related Art

Among aircraft, rotorcraft have at least one lift rotor associated with a carrier structure, which carrier structure is usually referred to as an "airframe" or a "fuselage".

Such an aircraft also has a power plant for driving a power transmission gearbox that is secured to the carrier structure of the aircraft. The power transmission gearbox then includes a mast for driving the lift rotor in rotation.

The power transmission gearbox is often connected to the carrier structure via its bottom wall and via associated fastener means generally comprising three or four sloping or vertical bars. Such a bar is referred to more simply below as a "tie bar". Because of its shape, the mounting structure for the lift rotor, i.e. the structure comprising the power transmission gearbox and the tie bars is sometimes referred to by the person skilled in the art as a "pylon".

The lift rotor and/or the power transmission gearbox can give rise to vibration that can degrade the comfort of occupants of the aircraft by generating vibratory motion and noise in the aircraft. Furthermore, equipment of the aircraft arranged in the carrier structure runs the risk of being degraded by the vibration generated by the mechanical assembly comprising the power transmission gearbox and the lift rotor.

Under such circumstances, various antivibration suspension structures are used at least to reduce vibration within the aircraft, and in particular within a cabin for the comfort of pilots and passengers.

Such an antivibration suspension structure must be capable firstly of transmitting the static loads induced by the mechanical assembly, and secondly of filtering the vibration induced by the mechanical assembly. A manufacturer generally seeks to obtain an antivibration suspension structure that has minimum impact in terms of weight and cost.

In the state of the art, antivibration suspension systems comprise resonators. The effects of resonators is to smother given vibration by creating vibration in phase opposition relative to the given vibration.

Such a resonator for a power transmission gearbox is sometimes provided with a lever supporting a fly-weight for each tie bar. Each sloping tie bar is thus hinged to a carrier structure by a lever supporting a fly-weight. Each lever is then hinged to the carrier structure via a torsion spring.

Each lever may possibly co-operate with a torsion spring or a torsion tube.

By way of example, Document FR 2 982 583 describes an antivibration suspension system comprising a lever extending from a distal end supporting at least one fly-weight to a proximal end provided with a first hinge for hinging the lever to the carrier structure. The antivibration suspension system has a second hinge for hinging the lever to a tie bar of a power transmission gearbox. Torsion return means are provided with a rotary actuator for adjusting the stiffness in twisting of the lever as a function of the flight conditions of the aircraft.

Those antivibration suspension structures provided with a lever carrying a fly-weight are advantageous. When the tie bar is excited by vibration, the tie bar in turn excites the lever. The fly-weight then performs swinging motion that serves to generate vibration that is in phase opposition relative to the original vibration.

Nevertheless, the lever presents a length that is relatively long considerably amplifying the swinging needed of the fly-weight. Such a length for the lever can make installing the antivibration suspension structure difficult in a congested environment.

Document FR 2 878 594 describes a device having at least one resilient plate. At least one resonator has two laminated elastomer bearings, each fastened to the resilient plate.

Document U.S. Pat. No. 4,365,770 describes a device having two masses. The two masses are carried by suspension arms. In addition, a spring extends from one mass to the other mass.

Document EP 0 853 197 does not form part of the technical field of the invention since it concerns a wind turbine. By way of information, Document EP 0 853 197 presents a resonator having two mutually meshing masses. The two masses drive an aluminum disk that carries a permanent magnet in order to generate an eddy current.

Documents FR 2 787 762, GB 207028, U.S. Pat. No. 1,641,230, and U.S. Pat. No. 6,016,289 are also known.

BRIEF SUMMARY OF THE INVENTION

An object of the present invention is thus to propose an antivibration suspension system for suspending a tie bar attached to a power transmission gearbox of an aircraft, and in particular an antivibration suspension system tending to present size that is limited.

The invention thus relates to an antivibration suspension system for suspending a tie bar of a power transmission gearbox of an aircraft. The antivibration suspension system comprises a lever suitable for being hinged to the tie bar, said antivibration suspension system including an oscillating mass.

Furthermore, the antivibration suspension system comprises a mechanical motion amplifier device interposed between the lever and the oscillating mass so that a first rotary movement of the lever through a first angle about a control axis induces a second rotary movement of the oscillating mass through a second angle, the second angle being greater than the first angle, the motion amplifier device being provided both with a mechanical inlet constrained to move in rotation with the lever about a control axis and with a mechanical outlet driving rotary movement of the oscillating mass. For example, the mechanical outlet is constrained to move in rotation with the oscillating mass, or the mechanical outlet drives rotary motion of the oscillating mass via a drive linkage.

Consequently, the invention proposes an antivibration suspension system having a lever hinged to a tie bar.

Under such circumstances, the lever is constrained to move in rotation with the mechanical inlet of the motion amplifier device. The oscillating mass is then carried by the motion amplifier device and not by the lever, being driven in rotation by the mechanical outlet of the motion amplifier device.

Under such circumstances, the invention does not propose a conventional system having a lever hinged to a tie bar and carrying an oscillating mass. The lever of the antivibration suspension system only has the function of setting the motion amplifier device into motion so as to enable the motion amplifier device to cause the oscillating mass to move in rotation.

Consequently, when the power transmission gearbox is subjected to vibration, the power transmission gearbox can excite at least one tie bar. In particular, the tie bar may be excited by forces that are directed longitudinally, i.e. lengthwise along the tie bar.

The longitudinal movement of the tie bar then excites the lever. The lever constitutes a member that transmits the forces passing via the tie bar to the antivibration suspension system. The lever transforms a longitudinal movement of a tie bar into a rotary movement that is transmitted to the motion amplifier device.

The lever then oscillates by performing clockwise and counterclockwise rotary movements in alternation about the control axis. Consequently, the mechanical inlet of the motion amplifier device moves in rotation through a first angle in the clockwise direction and in the counterclockwise direction about the control axis. The motion amplifier device amplifies the rotary movement of the mechanical inlet so as to drive the mechanical outlet with a second rotary movement performed in alternation in the clockwise direction and the counterclockwise direction through a second angle about an outlet axis. The outlet axis may coincide with the control axis. Each second angle is greater than the corresponding first angle.

Consequently, a small oscillation of the lever about its middle position makes it possible to obtain a large oscillation of the oscillating mass about its middle position. The movement of the oscillating mass serves to generate vibration for countering the vibration of the tie bar, in the same manner as a fly-weight carried by a lever in the prior art.

Nevertheless, since the movement of a tie bar is small, the use of a purely rotary system is not obvious in any way. That is why prior art resonators place a fly-weight at the end of a lever that is long. Nevertheless, the motion amplifier device enables a large amplification ratio to be generated between the rotation of the lever and the rotation of the oscillating mass.

For example, a system of the invention having a diameter of about ten centimeters makes it possible to obtain substantially the same performance as with a lever that is seventy centimeters long.

Consequently, the antivibration suspension system is a resonator having a motion amplifier device. For example, the motion amplifier device is a mechanical device, such as a gear device, possibly an epicyclic gear device, or a device that operates by friction. The motion amplifier device serves to amplify the movement of the lever hinged to a tie bar. Under such circumstances, the antivibration suspension system can obtain the expected results while presenting a size that can be reduced in comparison with the size of a system provided with a lever carrying a fly-weight.

The antivibration suspension system may also include one or more of the following characteristics.

Thus, the oscillating mass may comprise a weight element carried by at least one rod, at least one rod extending radially relative to a circle described by the weight element during the second rotary movement, each rod being secured to the mechanical outlet.

The length of each rod and the shape of the weight element are determined so as to optimize the size of the antivibration suspension system and the vibrations it produces.

Optionally, the weight element extends circumferentially relative to the circle described by said weight element. The weight element is then in the shape of a circular arc as described by the weight element when the lever of the antivibration suspension system is excited by a tie bar.

Furthermore, and by way of example, the motion amplifier device may be a mechanical device, such as a cycloidal device or indeed an epicyclic gear train.

Under such circumstances, the motion amplifier device comprises a sun stage in contact with a plurality of identical planets, the sun stage comprising the mechanical outlet, the planets being carried by a planet carrier secured to the lever, the mechanical inlet comprising the planet carrier, the motion amplifier device including a ring, each planet extending diametrically from the sun stage to the ring.

The term "planet carrier secured to the lever" means that the planet carrier performs movement in rotation about the control axis jointly with the lever.

Under such circumstances, the planet carrier is fastened by conventional means to the lever, and in particular to an end of the lever that is referred to for convenience as its "proximal" end. The planet carrier has one pin per planet, each planet being free to rotate about the corresponding pin. Conventional ball or roller bearing means may be interposed between each planet and the corresponding pin. Each planet is usually cylindrical.

The sun stage then comprises a sun wheel arranged in the middle of the planets. The sun stage is free to move in rotation about the control axis.

Consequently, rotation of the lever about the control axis induces rotation of the planet carrier about the control axis. The rotation of the planet carrier induces rotation of each planet about the corresponding pin of the planet carrier. Furthermore, the planets move along the ring and cause the sun stage to rotate about the control axis.

Consequently, the sun stage induces rotary movement of the oscillating mass about the axis of rotation.

Vibration of the tie bar then causes back-and-forth rotary movements of the lever, and finally back-and-forth rotary movements of the oscillating mass.

The term "each planet extending diametrically from the sun stage to the ring" means that a diameter of a planet extends from the sun stage to the ring. Each planet is thus in contact with the sun stage and with the ring.

Such a ring is secured to a casing of said antivibration suspension means. The casing is then held stationary by being fastened by conventional means to a carrier structure of the aircraft.

In addition, each planet may present a diameter that is greater than the diameter of said sun stage.

For example, planets having a diameter of about 4 centimeters and a sun stage having a diameter of about 1 centimeter make it possible to obtain a rotary motion amplification ratio of about 10. By way of illustration, the antivibration suspension system with such a motion amplifier device then has performance of the same type as that obtained with a lever having a length of 70 centimeters and carrying a fly-weight.

In the invention, each planet may present a diameter that is at least three times greater than the diameter of said sun stage, in order to obtain an amplification ratio greater than 8.

In addition, in order to obtain a high performance resonator, the antivibration suspension system advantageously presents minimized internal friction.

In a first variant, each planet includes peripheral teeth meshing with teeth of the sun stage and with teeth of the ring.

The sun stage and each planet thus comprise respective toothed gears. Advantageously, helical gearing may be used. Such gearing presents limited slack and friction.

In a second variant, each planet includes a peripheral coating of polyurethane in contact against a peripheral coating of the sun stage and against a peripheral coating of the ring.

For example, the sun stage and the ring may comprise metal tracks, with each polyurethane peripheral coating rubbing against those tracks.

Such a motion amplifier device presents the advantage of being inexpensive and relatively light in weight, but to the detriment of internal friction forces.

Furthermore, the planet carrier may have one pin per planet, each pin being secured to the lever, the planet carrier may have a holder plate secured to each pin, each planet being arranged about a respective pin and being movable in rotation about its pin between the holder plate and the lever.

The planets are then correctly positioned.

The holder plate is also pierced in its center so as to pass a segment of the sun stage that is secured to the sun wheel.

Furthermore, the antivibration suspension system may include a casing provided with a fastener member suitable for fastening the casing to a carrier structure of an aircraft, the motion amplifier device being connected to the lever inside the casing, the lever projecting in part from the casing through an opening in the casing.

The casing is thus a structural element connected to the carrier structure of the aircraft. The casing carries the motion amplifier device, the oscillating mass optionally being arranged outside the casing.

Where appropriate, the casing carries the ring of the motion amplifier device.

In addition, the antivibration suspension system may include a torsion tube, said torsion tube extending from a first end secured to the lever to a second end that is prevented from rotating relative to the control axis.

Where appropriate, the second end of the torsion tube is secured to the casing of the antivibration suspension system.

The torsion tube serves to withstand the static forces exerted by a tie bar on the lever. Furthermore, the torsion tube presents sufficient rotary flexibility to allow rotary movement of the lever when the tie bar is excited.

The fact of connecting the tie bar to a rotary system is particularly unobvious in that the system runs the risk of coming into abutment under the effect of the weight of the mechanical assembly carried by the lever. However, the torsion tube serves to withstand the static forces, but without that preventing the lever from moving when the tie bar is excited dynamically.

As an alternative, the antivibration suspension system could present stiffness that is independent of the lever, such as a flexible blade connecting the bottom of a power transmission gearbox to a body, for example.

It is also possible to envisage using an active device of the type described in Document FR 2 982 583.

In addition to an antivibration suspension system, the invention provides an antivibration suspension structure for a mechanical assembly having at least one lift rotor and a power transmission gearbox, the antivibration suspension structure having at least three tie bars, each tie bar being hinged via a top end to the power transmission gearbox and via a bottom end to an antivibration suspension system.

Under such circumstances, at least one antivibration suspension system is of the above-described type.

For example, each tie bar is hinged to such an antivibration suspension system.

The invention also provides an aircraft having a carrier structure and a mechanical assembly comprising a lift rotor and a power transmission gearbox for driving the lift rotor in rotation.

The aircraft then includes an antivibration suspension structure of the invention.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a diagrammatic view of an aircraft of the invention;

FIG. 2 is a diagrammatic view of antivibration suspension means;

FIGS. 6 and 7 are a face view and an exploded view of an embodiment of an antivibration suspension system.

DETAILED DESCRIPTION OF THE INVENTION

Figure 3:
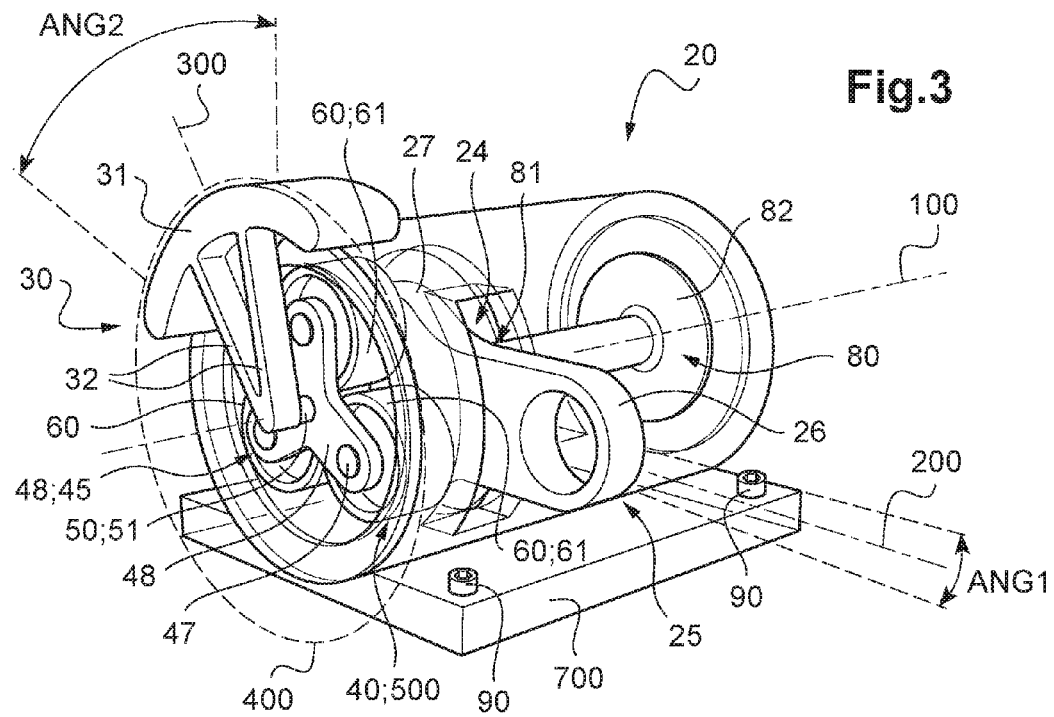
FIG. 3 is a three-dimensional view of an antivibration suspension system.

Elements present in more than one of the figures are given the same references in each of them.

FIG. 1 shows an aircraft 1 having a carrier structure 2. The aircraft 1 is also provided with a mechanical assembly 3 carried by the carrier structure 2 in order to contribute in particular to providing the aircraft 1 with lift.

The mechanical assembly 3 includes a lift rotor 5, a power transmission gearbox 4 of the mechanical assembly 3 being interposed between the lift rotor 5 and a power plant that is not shown in the figures. Under such circumstances, the power transmission gearbox 4 drives rotation of the lift rotor.

The aircraft 1 has an antivibration suspension structure for connecting the mechanical assembly 3 to the carrier structure while reducing the vibration and the noise generated by the mechanical assembly 3.

The antivibration suspension structure may comprise stiffeners 600 and/or dampers. For example, the antivibration suspension structure includes flexible blades 602 or a conventional resilient system 601 extending between the bottom of the power transmission gearbox and the carrier structure.

Furthermore, the antivibration suspension structure includes at least one tie bar 15, or indeed at least three tie bars 15. Each tie bar then extends from a top end 16 to a bottom end 17. Each top end 16 is hinged to the gearbox 4 and in particular to the top portion of the power transmission gearbox 4. Conversely, each bottom end 17 is hinged to an antivibration suspension system forming an interface between the tie bar 15 and the carrier structure 2.

At least one antivibration suspension system is an antivibration suspension system 20 of the invention.

The antivibration suspension system 20 comprises a lever 25 that extends longitudinally from a proximal end 27 to a distal end 26. The lever 25 is carried by a casing 21 of the antivibration suspension system 20. In the embodiment of FIG. 1, the lever 25 thus passes through an opening 24 in the casing 21 in order to arrange its proximal end 27 inside the casing 21 and its distal end 26 outside the casing 21.

Furthermore, a segment of the lever 25 situated in particular outside the casing 21 is hinged via a hinge to a tie bar 15. By way of example, a ball-joint type hinge is used. More precisely, the distal end 26 of the lever 25 is hinged to the bottom end 17 of a tie bar.

Furthermore, the antivibration suspension system 20 comprises a motion amplifier device 40 arranged between the lever 25 and an oscillating mass 30.

In addition, the casing 21 may include a conventional fastener member 90 for securing to the carrier structure 2. By way of example, the fastener member 90 comprises conventional adhesive, screw fastener, welding, stapling, . . . means.

FIG. 2 is a diagram illustrating an antivibration suspension system 20 of the invention, with FIG. 3 being a three-dimensional view of an antivibration suspension system 20.

With reference to FIG. 2, the casing 21 may have a bearing 22 or the equivalent for carrying the lever 25 without impeding a degree of freedom of the lever 25 to move in rotation about a control axis 100.

In addition, the antivibration suspension system 20 comprises a motion amplifier device 40 that is possibly arranged inside the casing 21. The motion amplifier device 40 is provided with a mechanical inlet 45 that is constrained to move in rotation with the lever 25 about the control axis 100. By way of example, the mechanical inlet 45 is secured to the proximal end 27 of the lever 25 by conventional adhesive, screw fastener, welding, stapling, . . . means.

Furthermore, the motion amplifier device 40 is provided with a mechanical outlet 50 that is movable in rotation about an outlet axis. For example, this outlet axis coincides with the control axis 100. The mechanical outlet 50 may be carried by a bearing 23 or the equivalent of the casing 21.

Furthermore, the mechanical outlet 50 is constrained to move in rotation with an oscillating mass 30 in the sense that the mechanical outlet serves to drive rotary movement of the oscillating mass 30. In particular, the mechanical outlet 50 and the oscillating mass 30 can move together in rotation about the outlet axis, and more particularly about the control axis shown in FIG. 2.

Under such circumstances, the motion amplifier device amplifies a first rotary movement ROT1 performed by the lever in order to generate a greater-amplitude second rotary movement ROT2 of the oscillating mass.

By way of illustration, the lever may perform a first rotary movement ROT1 through a first angle, i.e. a first amplitude of the order of a few degrees. Within a motion amplifier device of the invention presenting an amplification ratio of about 10, the oscillating mass then performs a second rotary movement ROT2 over a second angle, i.e. a second amplitude of the order of a few tens of degrees.

The motion amplifier device 40 may comprise a gear train. For example, the gear train may be a cycloidal train or an epicyclic train.

FIG. 2 shows a motion amplifier device 40 comprising an epicyclic gear train 500.

The motion amplifier device 40 thus comprises a sun stage 51 having a sun wheel 52 co-operating with a plurality of identical planets 60. Furthermore, the planets 60 are all carried by a planet carrier 46 representing the mechanical inlet 45 of the motion amplifier device.

The planet carrier 46 is constrained to move in rotation with the lever 25 about the control axis 100.

The planet carrier 46 thus has one pin 47 per planet 60. Consequently, the pins 47 are secured to the lever 25 by conventional means, and in particular they are secured to the proximal end 27 of the lever 25. The planet carrier 46 and the lever 25 may possibly form a single mechanical part.

Under such circumstances, each planet is arranged on a respective pin 47 while being free to rotate about the pin 47. For example, bearing means 620 may be interposed between each planet and the corresponding pin.

By way of example, such planets 60 comprise cylinders 61. More precisely, each planet 60 extends over a diameter referred to as the "planet diameter D2".

Furthermore, the planet carrier 46 of FIG. 2 has a holder plate 48 that is secured to each pin 47. Each planet 60 is thus arranged around a pin 47 and is free to move in rotation about the pin 47 between the holder plate 48 and the lever 25.

The motion amplifier device 40 also has a ring 70 in contact with the planets 60.

Consequently, each planet 60 extends diametrically from the ring 70 towards the sun stage 51. The ring 70 is secured to the casing 21, and the ring may be a portion constituting the casing 21.

The sun stage 51 is thus arranged at least in part in the middle of the planets.

By way of example, the sun stage 51 comprises a sun wheel 52 that co-operates with the planet, e.g. a cylinder. The sun wheel is then extended by an elongate portion 53 representing the mechanical outlet that is connected to the oscillating mass. The elongate portion 53 is optionally carried by the casing 21 via a bearing 23 which may be a rolling bearing or the equivalent.

In addition, the sun stage and in particular its sun wheel 52 extends over a diameter referred to as the "sun diameter D1".

Under such circumstances, the planet diameter D2 is greater than the sun diameter D1.

Figure 4:
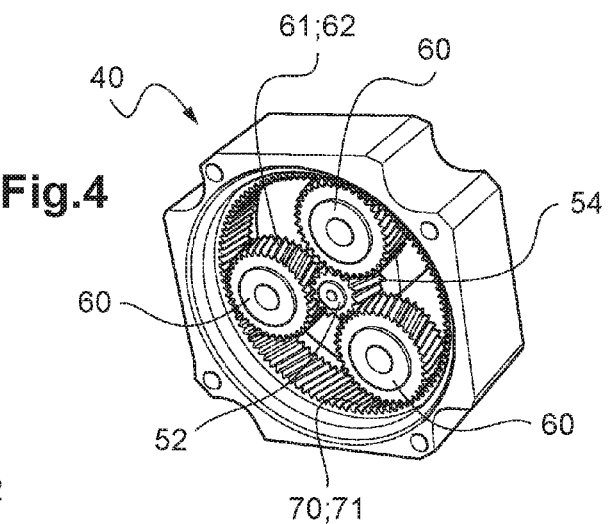
FIG. 4 is a diagram explaining an amplifying motion device having a gear device.

In the embodiment of FIG. 4, each planet 60 has teeth 62 at its periphery that mesh with teeth 54 of the sun wheel 52 of the sun stage 51 and with teeth 71 of the ring 70.

Figure 5:
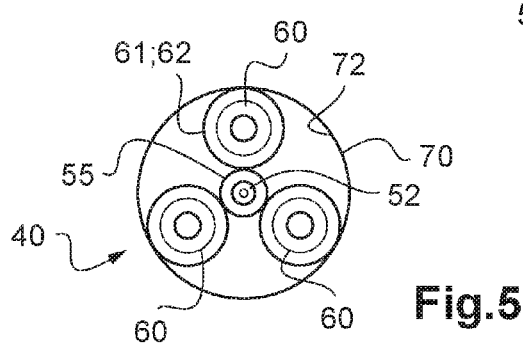
FIG. 5 is a diagram explaining an amplifying motion device having a friction device.

In the embodiment of FIG. 5, each planet 60 has a peripheral coating 63 of polyurethane on its periphery. This peripheral coating 63 rubs against a peripheral coating 55 of the sun stage 51 and a peripheral coating 72 of the ring.

Furthermore, and with reference to FIG. 3, the sun stage 51 represents the mechanical outlet 50 driving rotary movement of the oscillating mass 30.

Under such circumstances, and with reference to FIG. 3, the oscillating mass 30 may comprise at least one rod 32 secured to the sun stage 51, and in particular to its elongate portion 53. Each rod extends radially relative to a circle 400 described by the weight element.

A weight element 31 of the oscillating mass is then carried by each rod 32. The weight element is thus radially offset from the outlet axis about which the weight element oscillates with rotary motion.

In particular, the weight element extends circumferentially relative to said circle 400.

Consequently, when the tie bar hinged to the lever 25 is excited longitudinally under the effect of vibration, the lever performs a first rotary movement ROT1 about a middle position 200 through a first angle ANG1.

The rotary movement of the lever 25 about the control axis 100 gives rise to rotation of each planet about the control axis 100 and about the corresponding pin. In addition, the planet drives rotation of the sun stage 51 about the control axis 100.

The sun stage 51 then causes said oscillating mass 30 to perform a second rotary movement ROT2 about a middle position through a second angle ANG2. The second angle ANG2 is then greater than the first angle ANG1.

Furthermore, the antivibration suspension system may include a torsion tube 80.

The torsion tube 80 extends from a first end 81 that is secured to the lever 25 to a second end 82. The second end 82 is prevented from moving in rotation about the control axis 100, e.g. being secured to the casing 21.

FIGS. 6 and 7 show an embodiment of the invention.

In this embodiment, and with reference to FIG. 6, the oscillating mass 30 may comprise a weight element of any shape and in particular of cylindrical shape.

Furthermore, the casing 21 may have a plate 700 suitable for being fastened by conventional fastener members 90 to a carrier structure.

Each plate 700 possesses projections 701, 702, and 703.

Under such circumstances, the casing may comprise a hollow cylinder 21' in which the torsion tube 80 extends. By way of example, the cylinder 21' is screw-fastened via three points to two rear projections 702.

Furthermore, the casing 21 may include an end wall 21" provided with ring 70. By way of example, this end wall 21" is screw-fastened at three points to two front projections 701. The end wall 21" may possess a bearing 23 carrying the sun stage 51.

In addition, the plate 700 includes a central projection 703, with the proximal end 27 being hinged to the central projection 703.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An antivibration suspension system for suspending a tie bar of a power transmission gearbox of an aircraft, the antivibration suspension system comprising a lever hinged to the tie bar, the antivibration suspension system including an oscillating mass, wherein the antivibration suspension system comprises a mechanical motion amplifier device interposed between the lever and the oscillating mass so that a first rotary movement of the lever through a first angle about a control axis induces a second rotary movement of the oscillating mass through a second angle, the second angle being greater than the first angle, the motion amplifier device being provided both with a mechanical inlet constrained to move in rotation with the lever about the control axis and with a mechanical outlet driving rotary movement of the oscillating mass.

2. An antivibration suspension system according to claim 1, wherein the oscillating mass comprises a weight element carried by at least one rod, the at least one rod extending radially relative to a circle described by the weight element during the second rotary movement, each of the at least one rod being secured to the mechanical outlet.

3. An antivibration suspension system according to claim 2, wherein the weight element extends circumferentially relative to the circle.

4. An antivibration suspension system according to claim 1, wherein the motion amplifier device comprises a sun stage in contact with a plurality of identical planets, the sun stage comprising the mechanical outlet, the planets being carried by a planet carrier secured to the lever, the mechanical inlet comprising the planet carrier, the motion amplifier device including a ring, each planet extending diametrically from the sun stage to the ring.

5. An antivibration suspension system according to claim 4, wherein the ring is secured to a casing of the antivibration suspension system.

6. An antivibration suspension system according to claim 4, wherein each planet presents a diameter greater than the diameter of the sun stage.

7. An antivibration suspension system according to claim 4, wherein each planet includes peripheral teeth meshing with teeth of the sun stage and with teeth of the ring.

8. An antivibration suspension system according to claim 4, wherein each planet includes a peripheral coating of polyurethane in contact against a peripheral coating of the sun stage and with a peripheral coating of the ring.

9. An antivibration suspension system according to claim 4, wherein the motion amplifier device comprises an epicyclic train.

10. An antivibration suspension system according to claim 4, wherein the planet carrier has one pin per planet, each pin being secured to the lever, the planet carrier having a holder plate secured to each pin, each planet being arranged about a respective pin and being movable in rotation about its pin between the holder plate and the lever.

11. An antivibration suspension system according to claim 1, wherein the antivibration suspension system includes a casing provided with a fastener member suitable for fastening the casing to a carrier structure of an aircraft, the motion amplifier device being connected to the lever inside the casing, the lever projecting in part from the casing through an opening in the casing.

12. An antivibration suspension system according to claim 1, wherein the antivibration suspension system includes a torsion tube, the torsion tube extending from a first end secured to the lever to a second end that is prevented from rotating relative to the control axis.

13. An antivibration suspension structure of a mechanical assembly having at least one lift rotor and a power transmission gearbox, the antivibration suspension structure having at least three tie bars, each tie bar being hinged via a top end to the power transmission gearbox and via a bottom end to an antivibration suspension system, wherein at least one antivibration suspension system is a system according to claim 1.

14. An antivibration suspension structure according to claim 13, wherein each tie bar is hinged to an antivibration suspension.

15. An aircraft having a carrier structure and a mechanical assembly comprising a lift rotor and a power transmission gearbox for driving the lift rotor in rotation, wherein the aircraft includes an antivibration suspension structure according to claim 13.

* * * * *